United States Patent
Balazich et al.

(10) Patent No.: US 7,099,997 B2
(45) Date of Patent: Aug. 29, 2006

(54) READ-MODIFY-WRITE AVOIDANCE USING A BOUNDARY WORD STORAGE MECHANISM

(75) Inventors: Douglas G. Balazich, Poughkeepsie, NY (US); Douglas J. Joseph, Danbury, CT (US); Peter K. Szwed, Ithaca, NY (US); Carl A. Bender, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/375,330

(22) Filed: Feb. 27, 2003

(65) Prior Publication Data

US 2004/0172504 A1    Sep. 2, 2004

(51) Int. Cl.
*G06F 13/00* (2006.01)
(52) U.S. Cl. .................. 711/118; 711/145; 711/152; 711/155
(58) Field of Classification Search ................ 711/118, 711/145, 152, 155
See application file for complete search history.

(56) References Cited

U.S. PATENT DOCUMENTS

| | | | |
|---|---|---|---|
| 5,008,886 A | 4/1991 | Chinnaswamy et al. | 371/40.2 |
| 5,185,875 A | 2/1993 | Chinnaswamy et al. | 395/425 |
| 5,586,294 A | 12/1996 | Goodwin et al. | 395/464 |
| 5,668,967 A | 9/1997 | Olson et al. | 395/842 |
| 5,860,091 A | 1/1999 | DeKoning et al. | 711/114 |
| 5,867,640 A | 2/1999 | Aguilar et al. | 395/182.04 |
| 5,875,466 A * | 2/1999 | Wakerly | 711/138 |
| 5,905,911 A * | 5/1999 | Shimizu | 710/22 |
| 6,070,010 A | 5/2000 | Keenleyside et al. | 395/705 |
| 6,226,703 B1 | 5/2001 | Ervin et al. | 710/129 |
| 6,266,723 B1 | 7/2001 | Ghodrat et al. | 710/100 |
| 6,370,611 B1 | 4/2002 | Callison et al. | 711/105 |
| 6,434,657 B1 | 8/2002 | Brown | 711/1 |
| 6,434,674 B1 | 8/2002 | DeWilde et al. | 711/149 |

* cited by examiner

*Primary Examiner*—Reba I. Elmore
(74) *Attorney, Agent, or Firm*—Lawrence D. Cutter, Esq.; Jill M. Breedlove, Esq.; Heslin Rothenberg Farley & Mesiti P.C.

(57) ABSTRACT

The utilization of a controlled buffer and tags associated with read requests and the transmission of data in response to these requests, along with the transmitted tag information, is used to avoid a read-modify-write operations occurring in a communications adapters whose function it is to assemble various pluralities of data blocks, each with a varying amount of information, into single data packets for transmission from the adapter's memory. The presence of error correction capabilities associated with the adapter's memory would otherwise require the utilization of the read-modify-write operation which is bandwidth limiting.

5 Claims, 5 Drawing Sheets

| TAG | AMEM START ADDRESS | SIZE | BOUNDARY WORD REGISTER | PREVIOUS TAG |
|---|---|---|---|---|
| | | | | |
| | | | | |
| | | | | |
| | | | | |
| | | | | |

READ PENDING TRANSACTION BUFFER (RPTB)

READ-MODIFY-WRITE AVOIDANCE USING A BOUNDARY WORD STORAGE MECHANISM

BACKGROUND OF THE INVENTION

The present invention is generally directed to methods and systems for transferring a plurality of blocks of data of varying size to a memory that includes error correction code (ECC) capabilities that are applied to portions of the memory that are not changed when new data to be stored is received, particularly when that data does not fall on memory address boundaries corresponding to the error correction boundaries for the memory. More particularly, the present invention is directed to a system and method for ensuring that data written into an ECC protected memory word includes already-written data when the amount of data being written is less than a full ECC protected word. Even more particularly, the present invention is directed to a system and method which employs tags associated with data blocks that may or may not span multiple ECC protected memory words.

The present invention is particularly useful in data processing systems employing or including a plurality of nodes. Each of these nodes may include one or more processors. Either at the node level or at the processor level, but more typically at the node level, it is typically the case that data is to be sent elsewhere, that is to other nodes or processors in the same data processing system or to nodes or processors in remote systems. The link to "elsewhere" in many systems is an adapter, also known as a communications adapter. More particularly, in systems marketed and sold by the assignee of the present invention, this function is provided by what is referred to as a host channel adapter (HCA). It is the function of the HCA, and similar communication adapters, to assemble a plurality of blocks of data of varying length into a data packet. The data packet thus includes one or more, and typically multiple, data blocks. Each one of the data blocks typically includes a different number of bytes. The HCA includes an addressable memory in which the data packets are assembled prior to their transmission out of the adapter to "elsewhere."

Because of increases in interprocessor communication rates, it is also desirable to increase the memory buffer resources on host channel adapters (HCAs). Thus, it is also seen that it is desirable to increase the density of memory devices that are used in host channel adapters. Because of this increase in memory density, there is an increase in the probability of bits errors due to the well known problem of alpha particle interactions. Since this leads to an increase in the bit error rate for stored data, it is sensible for HCA vendors to use Error Correcting Code (ECC) to protect the HCA memory contents. Typically, an ECC implementation covers multiple bytes of data with a single set of ECC check bits used for error detection and for error correction. For example, a set of 8 ECC check bits is found to be typical for protecting 64 bits of data, that is, for protecting a single data word (see below for the meaning of "word" as used herein).

As used herein the term "word" in reference to the memory that receives data refers to the number of bytes that go into the computation of check bits used by ECC circuitry in the memory. It also refers to the quantity of data that is written into the memory at one time, that is during one write cycle operation. It is also noted that herein one is not necessarily limited to "bytes" of data that are always 8 bits long. This is not an attempt to change the commonly accepted definition of what constitutes a "byte," but rather is merely an indication that the present invention is not limited by the number of bits written into or read from the receiving memory at one time. It is this amount of data that is protected using redundant bits provided by any convenient error detection and/or error correction method.

If data to be written to the memory were supplied in quantities that always fell on word boundaries for the memory, there would be no problem. However, in situations such as the one addressed by the present invention, a major function of the HCA (or any similar device) is the assembling of packets of information from a plurality of blocks of data (say, from 1 to n blocks) with each block containing a variable number of bytes (say, from 1 to m bytes). In this situation chunks of data arrive which do not fall on word boundaries of the memory in the HCA device in which packets for transmission are assembled.

When only a portion of a data word in an ECC protected memory is to be modified, all of the bytes of that data word are still used internally in the memory for the calculation of new check bits for that data word. Thus, a read-modify-write operation is typically performed: the complete addressed data word is read from the memory before the new ECC can be calculated and the new data word written into the memory. It is one of the objects of this invention to eliminate the need for performing this read operation since it is otherwise a constraint on the bandwidth of the HCA and also on the bandwidth of the data processing system in which it is employed.

SUMMARY OF THE INVENTION

In accordance with a first preferred embodiment of the present invention, a method and system are provided for transferring blocks of data of varying size to an addressable memory having data stored therein in words which are protected by error correction. In the present invention, if the first word of a requested data block does not start on and span across an error correction word boundary of the HCA memory, then the portion that would be contained within the first error correction word boundary in the HCA memory for that block is stored within a register or buffer. Likewise, if the last word of a requested block does not end on and span across an error correction word boundary of the HCA memory, then the portion of that word that would be contained within the last error correction word boundary in the HCA memory for that block is stored in a register or buffer. Received portions of data blocks are merged in the buffer or register with the adjacent portions so as to form words aligned with addresses in the addressable HCA memory corresponding to the error correction word boundaries. In this fashion, partial buffer or register contents are always available for storing portions of data blocks into the addressable memory without the need for performing a read operation to retrieve portions of memory words that are unchanged. The present invention also preferably employs tags that link read requests to the data blocks that are returned in response to a read request.

As blocks of data are written into the communication memory (that is into the memory of the HCA), if a particular block ends on an uneven boundary, which would normally require a read-modify-write operation in order to calculate the corresponding ECC, rather than reading out the target data word, the last partial-data word is written into the memory and is also stored in a side buffer as a "boundary word" for that block. When the next sequential block of data is to be written into the memory, because the previous block ended on an uneven boundary, this next block starts on a corresponding uneven boundary. To calculate the ECC check bits for the first partial-data word, the previously stored "boundary word" is retrieved from the side buffer and is merged with the new data and used in the calculation of the new ECC value.

Using boundary words to manage the writing of data into the communication memory provides a significant advantage in that it improves the bandwidth into that memory. In this regard, it should be noted that the boundary word buffer, particularly as employed herein, is typically implemented with very fast registers that are accessed in a single cycle, without contention. In contrast, the communication memory on an HCA is typically implemented using a memory that may take several cycles to access, and may be shared between several elements, thus resulting in contention for every access. Using the boundary word method herein removes the need to perform a read from the slower memory as part of the ECC calculation for parts of the data stream being written to the communication memory.

Accordingly, it is an object of the present invention to increase the bandwidth of host channel adapters and like devices and systems which are employed in assembling packets of data.

It is a further object of the present invention to promote the reliability of data communications by eliminating one of the drawbacks that can occur in the use of error correction and detection.

It is also an object of the present invention to eliminate read-modify-write operations that would otherwise be employed in the process of assembling data packets in an ECC protected memory.

It is a still further object of the present invention to provide a buffer mechanism operating faster than the ECC protected adapter memory as a replacement for a memory read operation.

It is yet another object of the present invention to increase the flexibility of storage operations associated with the assembling of data packets, especially with respect to data packets built from multiple blocks of varying size (width).

Lastly, but not limited hereto, it is object of the present invention to increase the efficiency and reliability of interprocessor communications.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 5 is a block diagram illustrating the field structure provide in the Read Pending Transaction Buffer (RPTB)

DETAILED DESCRIPTION OF THE INVENTION

Figure 1:
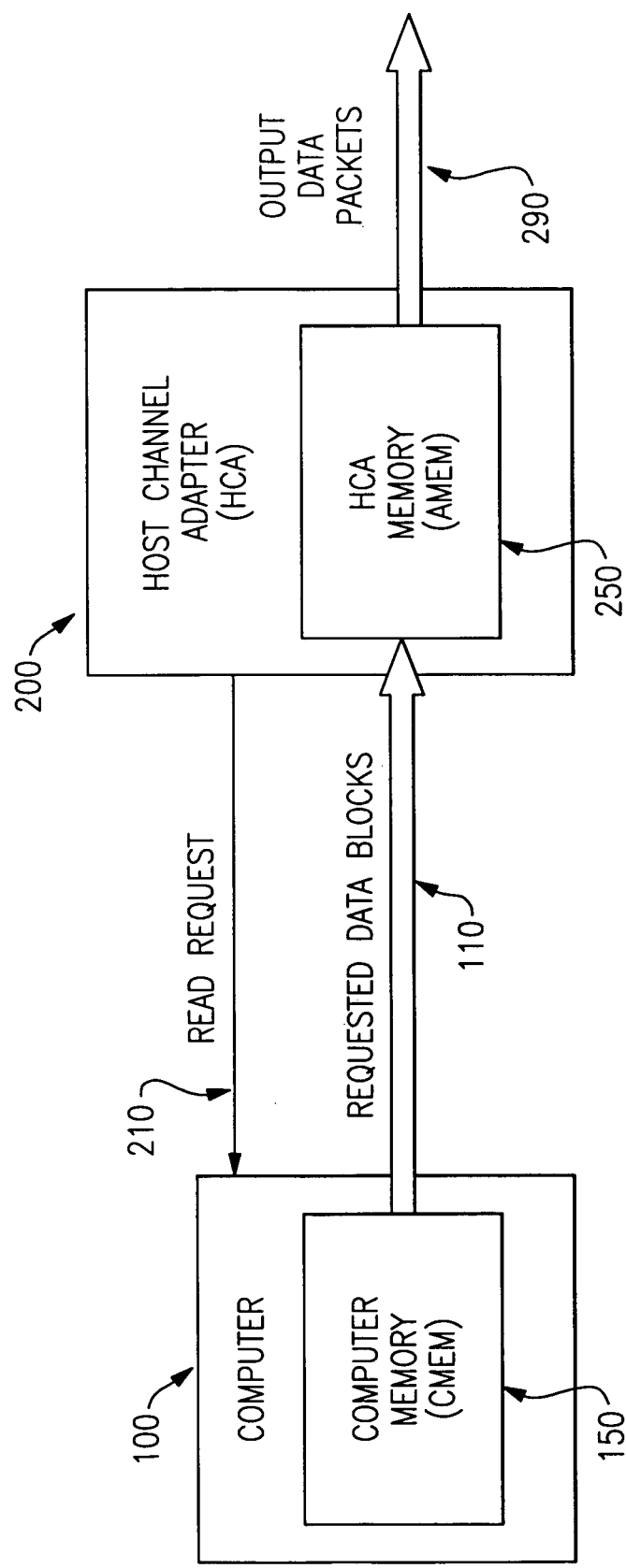
FIG. 1 is a block diagram providing an overview of the environment in which the present invention is employed.

To facilitate the communication of data between two computers, between two processors or between two data processing systems, each computer typically employs a hardware element called a Host Channel Adapter (HCA) that connects between a memory or I/O channel on the local computer and an external communication link. Via the HCA, a particular computer sends data from its local memory to a remote computer, or receives data from a remote computer for storage in its local memory. This situation is illustrated more particularly in FIG. 1 which provides an overview illustration of the environment in which the present invention is employed. Computer 100 in FIG. 1 includes memory 150 which contains data which is to be assembled into packets. Read Request 210 from HCA 200 results in the transmission of requested blocks of data from memory 150 (CMEM—for "computer" memory) to HCA 200 for assembly into data packets 290 in memory 250 (AMEM—for "adapter" memory) for transmission.

During a send operation, HCA 200 functions to gather requested data blocks 110 from computer memory 150, assemble those blocks into a packet utilizing memory local to HCA (AMEM 250), and, once assembly is complete, send output data packet 290 out on an external communication link. For a given packet, there may be from 1 to n blocks of data to gather, and those blocks may be of different sizes, ranging from 1 to m bytes each, as described above.

Figure 2:
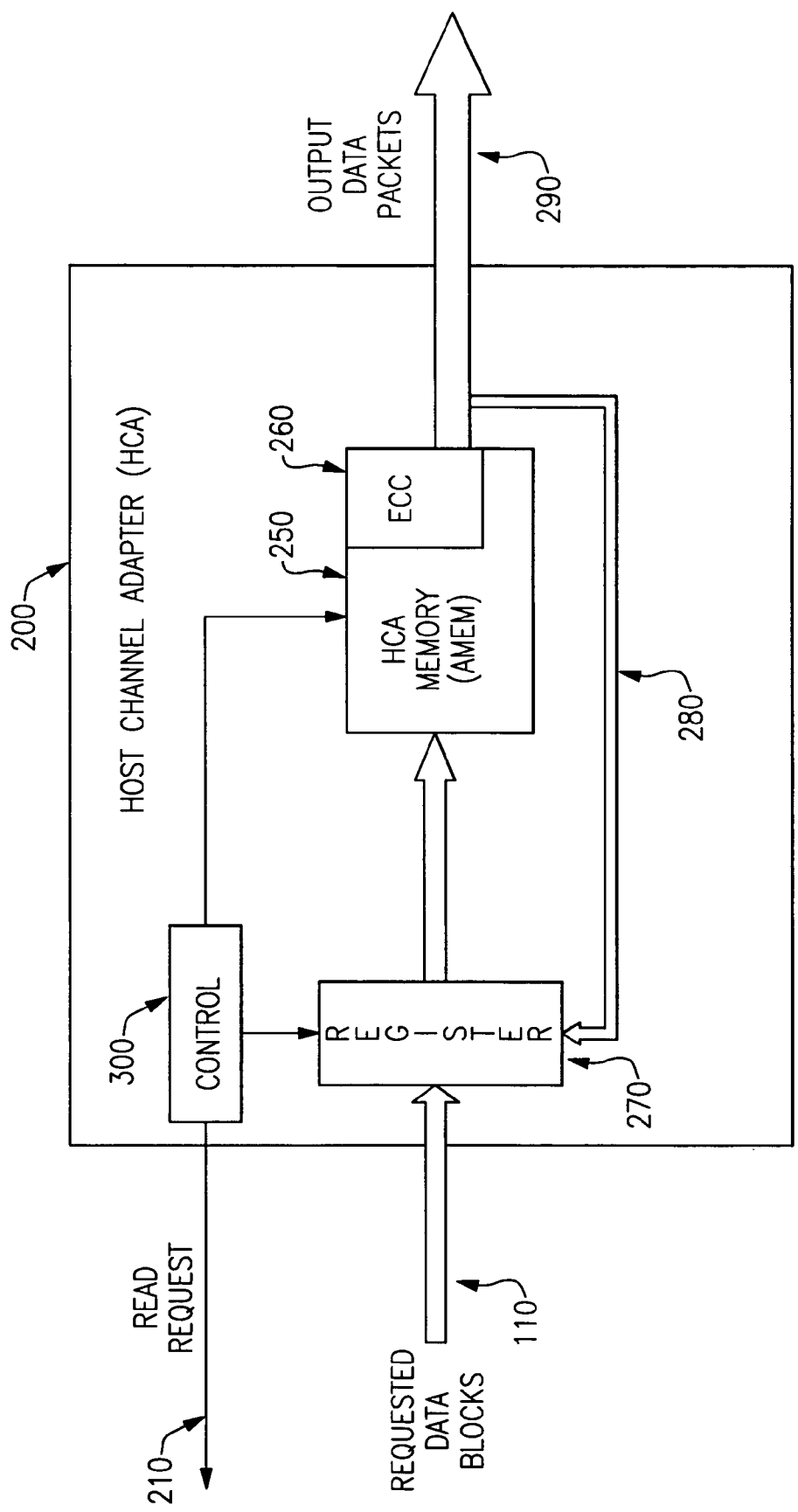
FIG. 2 is a block diagram illustrating the structure of a Host Channel Adapter in a manner which highlights one of the specific problems solved by the present invention.

However, in preferred HCA designs, it is desirable to protect the data in AMEM 250 via the use of Error Correcting Code (ECC) circuits 260, as shown in FIG. 2. The ECC circuit generates redundant check bits that are associated with an AMEM memory word, which is typically the smallest addressable portion of AMEM 250. Typically, the data word covered by an ECC is greater than a single byte. For example, there exist ECC mechanisms where an 8 byte data word is covered by a single 8-bit ECC byte. A problem with using ECC to protect multibyte data words in memory, is that if only a portion of a data word in the memory is to be updated, then the entire data word normally would have to be read out in order to calculate the new ECC value for the new, merged data word. FIG. 2 illustrates the fact that data return path 280 is provided as a mechanism for feeding back to input register 270 the value of the word containing the portion that is not to be over written when a partial block is received by the HCA. This operation is called a read-modify-write operation (RMW). As a result of the RMW, the bandwidth between CMEM 150 and AMEM 250 is reduced. The present invention eliminates the need for a read-modify-write operation and thus also eliminates the need for feedback path 280. Put another way, the present invention eliminates the need to read AMEM 250 when updating a partial data word in AMEM 250, thus improving bandwidth between the CMEM and the AMEM.

Figure 3:
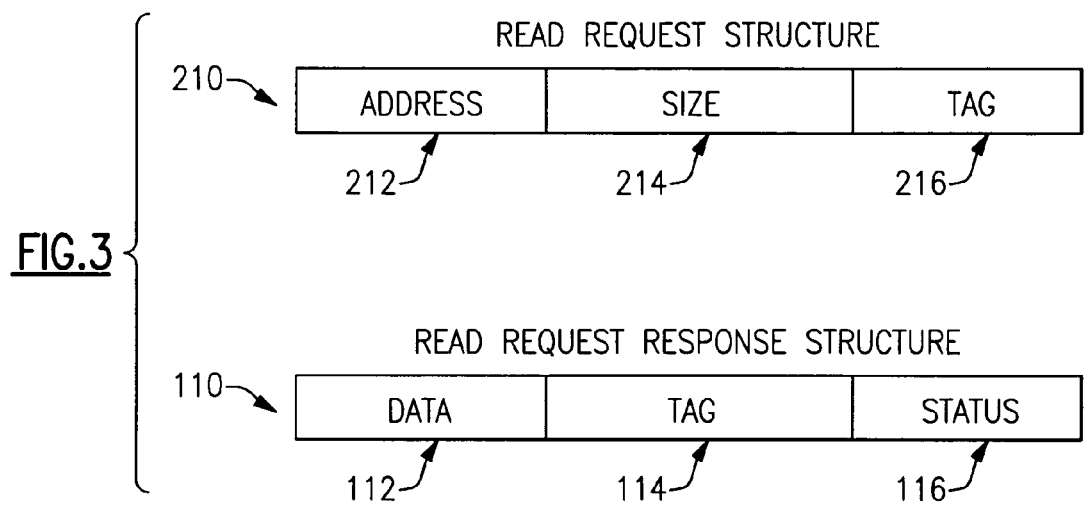
FIG. 3 is a block diagram illustrating the field structures associated with a read request sent from a Host Channel Adapter and the field structure associated with a corresponding data response.

Prior to reading blocks from CMEM 150 for the packet, control unit 350 in HCA 200 allocates an area in AMEM 250 in which blocks 110 are assembled into packet 290. As each read-request for the data blocks is issued to CMEM 150, it is assigned a transaction tag (see FIG. 3 for the structure of the read request and its associated read response) that is attached by computer 100, or by CMEM 150 itself, to read-response data blocks (see reference numeral 110 in FIG. 3). In accordance with the present invention, HCA 200 is provided with read-pending transaction buffer (RPTB) 400 whose structure is more particularly illustrated in FIG. 5. Under control of control unit 350 RPTB 400 stores information about each transaction, and is indexed via the tag value. The tag value is initially provided by HCA 200 in field 216 in Read Request Structure 210. This same tag value is returned in field 114 of Read Request Response Structure 110. An entry in RPTB 400 contains: the address in AMEM 250 where the read-response data is to be stored (AMEM_START_ADDR); the size of the response data (SIZE); a field containing the tag for the transaction that updates the first byte of the data word addressed by the AMEM_START_ADDR (PREV_TAG). Finally, each tag value has a Boundary Word Register (BWR) associated with it. The purpose of the BWR is to store the sub-data word fragment at the tail of the data block being written to the AMEM. Using procedures described below, which is carried out under the direction of control unit 350 the BWR is used to complete each of the data words being written to the AMEM, rather that having to read the AMEM to get the fragments at the block boundaries.

The primary advantage of using BWR 400 rather than reading AMEM 250, is that BWR 400 is easily implemented as a single-cycle access memory that is dedicated to the boundary word function. Typically, an AMEM is so dense as to require several cycles for access, and may be shared between several elements, thus resulting in potential collision for each access and a concomitant reduction in overall bandwidth through the HCA.

The Procedure

The following assumptions underlie the operation of the preferred embodiment of the present invention: while assembling blocks from the CMEM into a packet in the AMEM, it is assumed that the packet starts on an AMEM address corresponding to the first byte of a data word; also, it is assumed that if the total length of the blocks assembled does not equal a number of bytes that is an integer multiple of the number of bytes in a data word, then the end-padding bytes are 'don't care' bytes since they are not intended for transmission.

1. When data blocks are required from the CMEM for the construction of a packet, the HCA generates a series of read requests 210. Each read request 210 is assigned a transaction tag (see field 216 in FIG. 3). When CMEM 150 (or computer 100) responds to a read request, the transaction tag that is associated with the corresponding read request is returned with the read-response data (see field 114 in FIG. 3).

2. As assumed, the AMAC_START_ADDR for the first data block is even (that is, it points to the AMEM address of the first byte of a data word). Subsequent AMEM_START_ADDR (AMEM Start Address in FIG. 5) values for a given tag are equal to the AMEM_START_ADDR+SIZE for the previous tag's block request.

3. For a particular tag, the PREV_TAG (Previous Tag in FIG. 5) value corresponds to the tag assigned to the transaction which updates the first byte of the data word addressed by AMEM_START_ADDR. This value is only meaningful if the AMEM_START_ADDR does not address the first byte of a data word.

4. When transferring a block of read-response data received in from CMEM 150, if the AMEM_START_ADDR is uneven (that is, an address not corresponding to the first byte of a data word), then the BWR for the tag contained in the PREV_TAG field of the current transaction's RPTB entry is merged with the first sub-word of CMEM data to be written to AMEM 250. The resulting data word is then transferred to the AMEM address corresponding to the first byte of the data word containing the byte addressed by the AMEM_START_ADDR, and is also stored back into the BWR for the PREV_TAG.

5. When transferring a block of read response data 110 received from CMEM 150, if the final byte of the block to be written to the AMEM is not the final byte of an AMEM data word, and if the AMEM_START_ADDR for the transaction does not reference the same data word that contains the last byte in the block, then the BWR for the current transaction's tag is merged with the last sub-word of CMEM data to be written to AMEM 150. The resulting data word is then transferred to the AMEM address corresponding to the first byte of the data word containing the last byte of the original CMEM data to be written to AMEM 150, and is also stored back into the BWR for the current tag.

EXAMPLE

Figure 4:
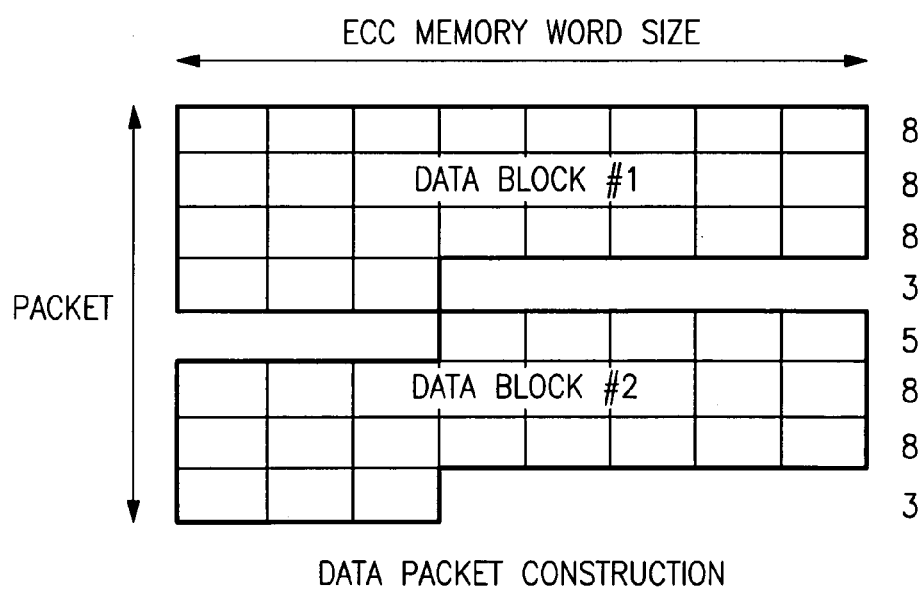
FIG. 4 is a diagram illustrating the nature of the problem caused when the returned data portion is less than a full word, thus resulting in overlapping data only some of which is different than data destined for the same word in the HCA memory.
Figure 6:
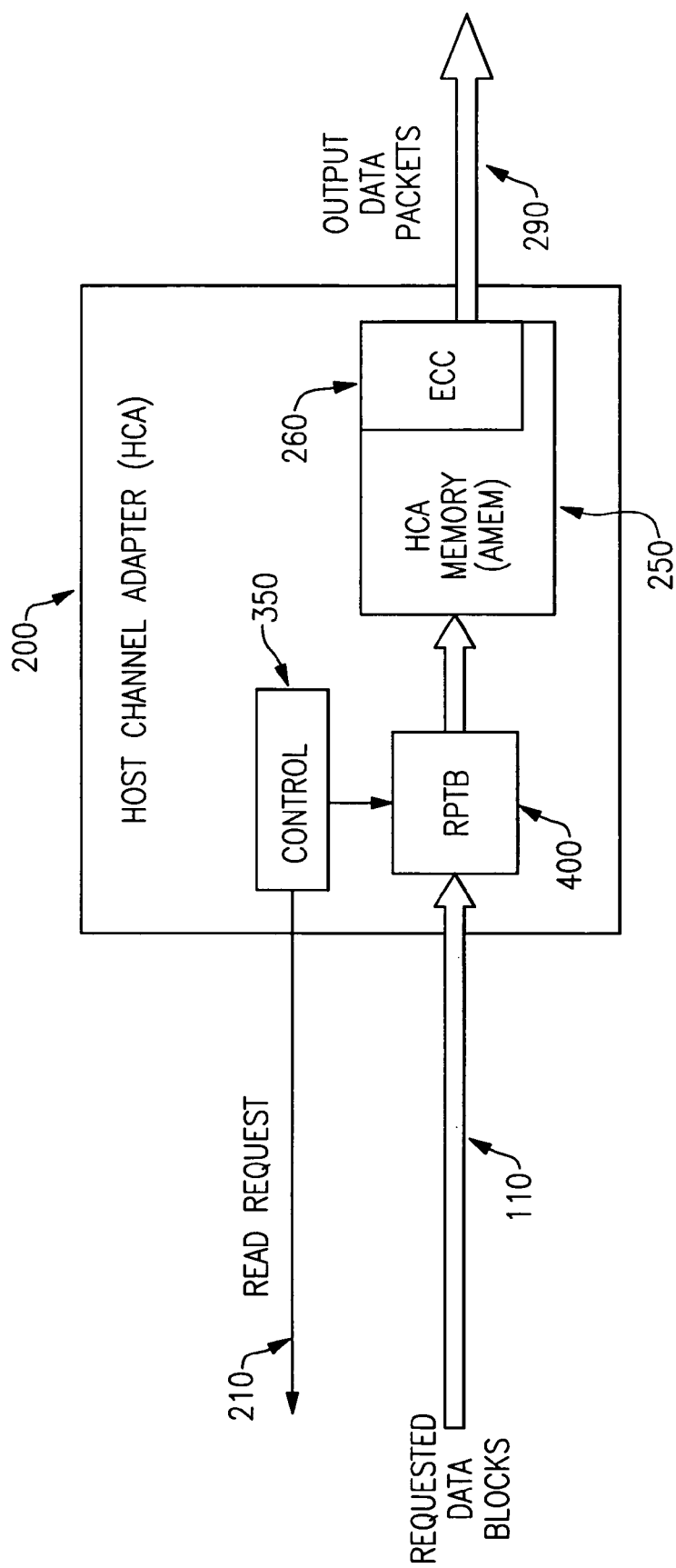
FIG. 6 is a block diagram of a system in accordance with the present invention which avoids the need for read operations from the HCA memory.

In the following example, the AMEM is 8 bytes wide, and the ECC covers 8 bytes, but is not part of the addressed space. A view of this example is also provided in FIG. 4 which indicates the filling up of 3 words in AMEM up to and including the arrival of a partial word having only 3 bytes.

A packet that is $33_{16}$ (the subscript indicating a hexadecimal notation base) bytes long (decimal 51) is to be sent out by the HCA. In this case, the packet is made up of 2 blocks of data from CMEM 150, where the boundary between the 2 blocks ends up being uneven in AMEM 250. Table I below shows the structure of the data blocks as they are assembled in AMEM 250. The entries in single quotes in Table I represent hexadecimal values. When the last data word of block #1 is written into AMEM 150, it is merged with the BWR for tag #1 (BWR(1)), such that the first 3 bytes of the data word are the last 3 bytes of block 1, and the last 5 bytes are the last 5 bytes in BWR(1). BWR(1) is updated so that its first 3 bytes are the last 3 bytes from data block #1, and it's last 5 bytes are unchanged.

When the first data word of block #2 is written, $0000_{16}$ into the AMEM, it is merged with BWR(1), such that the first 3 bytes of the data word are the first 3 bytes from BWR(1), and the last 5 bytes of the data word are the first 5 bytes of block #2. BWR(1) is then updated so that the last 5 bytes are the first 5 bytes of block 2, and the first 3 bytes are unchanged.

Note that the order in which the data blocks are received in from CMEM 150 does not affect the execution of the algorithm or the correctness of the final packet as it is built in AMEM 250.

TABLE I

| Tag | AMEM_START_ADDR | DSIZE | PREV_TAG |
|---|---|---|---|
| 1 | '0000' | '1B' | xxx |
| 2 | '001B' | '18' | 1 |

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for transferring blocks of data of varying size to an addressable memory having words stored therein which are protected by error correction, said method comprising:
   storing, within a register, sequentially adjacent portions of received data blocks not falling on error correction word boundaries of said addressable memory; and
   storing, within said addressable memory, received portions of data blocks merged with said adjacent portions so as to form words within said addressable memory corresponding to said error correction word boundaries for said addressable memory.

2. The method of claim 1 in which said register is part of a multiword buffer.

3. The method of claim 2 in which said buffer includes tags associated with said blocks of data.

4. A communications adapter for assembling a plurality of different size data blocks into a single data packet, said adapter comprising:
   a memory for storing data addressable by words which are protected by error correction coding;
   a buffer for storing a plurality of received words and for storing a tag for each received word;
   a control circuit for controlling said buffer so as to merge less than word size portions of received data with data stored in said buffer which matches data stored in said memory as indicated by said tags stored in said buffer.

5. A computer readable medium having computer executable instructions for transferring blocks of data of varying size to an addressable memory having words stored therein which are protected by error correction, by carrying out the steps of:
   storing, within a register, sequentially adjacent portions of received data blocks not falling on error correction word boundaries of said addressable memory; and
   storing, within said addressable memory, received portions of data blocks merged with said adjacent portions so as to form words within said addressable memory corresponding to said error correction word boundaries for said addressable memory.

* * * * *

UNITED STATES PATENT AND TRADEMARK OFFICE
CERTIFICATE OF CORRECTION

PATENT NO. : 7,099,997 B2  Page 1 of 1
APPLICATION NO. : 10/375330
DATED : August 29, 2006
INVENTOR(S) : Balazich et al.

It is certified that error appears in the above-identified patent and that said Letters Patent is hereby corrected as shown below:

Line 5, delete the word "adapters" and insert the word --adapter--

Col. 5, lines 61 & 62, delete "AMEM_STAR-T_ADDR" and insert --AMEM_START_ADDR--

Col. 6, lines 5 & 6, delete "AMEN_STAR-T_ADDR" and insert --AMEM_START_ADDR--

Signed and Sealed this

Twenty-eighth Day of November, 2006

JON W. DUDAS
*Director of the United States Patent and Trademark Office*